(12) United States Patent
Franaszek et al.

(10) Patent No.: US 6,804,754 B1
(45) Date of Patent: Oct. 12, 2004

(54) SPACE MANAGEMENT IN COMPRESSED MAIN MEMORY

(75) Inventors: Peter Anthony Franaszek, Mt. Kisco, NY (US); Michel Henri Theodore Hack, Peekskill, NY (US); Charles Otto Schulz, Ridgefield, CT (US); Thomas Basil Smith, III, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 08/859,865

(22) Filed: May 21, 1997

(51) Int. Cl.$^7$ ............................................. G06F 12/00
(52) U.S. Cl. ...................... 711/165; 711/163; 711/159; 711/208
(58) Field of Search ............................. 711/163, 159, 711/203, 207, 208, 209, 165

(56) References Cited

U.S. PATENT DOCUMENTS

| | | | | |
|---|---|---|---|---|
| 4,972,338 A | * | 11/1990 | Crawford et al. | 711/206 |
| 5,012,408 A | * | 4/1991 | Conroy | 711/172 |
| 5,598,553 A | * | 1/1997 | Richter et al. | 711/209 |
| 5,696,926 A | * | 12/1997 | Culbert et al. | 711/203 |
| 5,696,927 A | * | 12/1997 | MacDonald et al. | 711/207 |
| 5,699,539 A | * | 12/1997 | Garber et al. | 711/2 |
| 5,761,536 A | * | 6/1998 | Franaszek | 710/68 |

OTHER PUBLICATIONS

Helen Custer, "Inside Windows NT", Microsoft Press, pp 184–202; 1993.*
A.S. Tanenbaum, "Modern Operating Systems," SEC. 3.4.5 The Clock Page Replacement Algorithm, Prentice Hall, Englewood Cliffs, N.J., pp. 111 (1992).
J. Ziv & A. Lempel, "A Universal Algorithm for Sequential Data Compression," IEEE Transactions On Information Theory, IT–23, pp. 337–343 (1977).
D.A. Patterson & J.L. Hennessy, "Computer Architecture A Quantitative Approach," 2nd Edition, Morgan Kaufmann, Publishers, Inc., San Francisco, CA, pp. 445–446 (1996).

* cited by examiner

Primary Examiner—Reginald G. Bragdon
(74) Attorney, Agent, or Firm—Derek S. Jennings, P.A.; Heslin Rothenberg Farley & Mesiti P.C.

(57) ABSTRACT

Memory is managed by controlling the expansion of memory contents, especially in those computing environments in which the memory contents are compressed. Control is provided by imposing some restrictions to memory references outside a specified subset of the memory contents, and by controlling the transfer of items into the subset. In one example, the transfer of items into the subset is based on a function of parameters, including an estimate of the amount of free space in the memory.

12 Claims, 5 Drawing Sheets

SPACE MANAGEMENT IN COMPRESSED MAIN MEMORY

TECHNICAL FIELD

This invention relates, in general, to computer architecture and, in particular, to the management of compressed main memory in a computer system.

BACKGROUND ART

An emerging development in computer organization is the use of data compression in main storage or memory. In such systems, each cache line is compressed prior to being written into memory, using, for instance, a standard compression algorithm, such as that described by J. Ziv and A. Lempel, "A Universal Algorithm For Sequential Data Compression," IEEE Transactions on Information Theory, IT-23, pp. 337–343 (1997), which is hereby incorporated by reference in its entirety. A convenient way to perform this is by automatically compressing the data using special-purpose hardware, with a minimum of intervention by the software or operating system. This permits compression/decompression to be done rapidly, avoiding what might otherwise be long delays associated with software compression/decompression.

A problem with such compression of the main memory contents is that the amount of space occupied by a set of cache lines (or pages) may vary with time, as changes to the data they contain changes the resulting compression ratio. This means that the amount of space required for a given set of data cannot be known in advance. As a result, it is possible that at some point, a cache line cannot be written back into memory because there is insufficient space. This results in an abnormal end of processing (i.e., a system crash).

One possible approach to this problem is to initiate page-outs whenever the amount of free space is judged to be too low. However, in some systems, there is no guarantee that the standard paging mechanism will complete page-outs in time to avoid abnormal ends.

Based on the foregoing, there is a need for an enhanced mechanism to prevent uncontrolled expansion of the memory contents in systems which, for example, utilize main memory compression.

SUMMARY OF THE INVENTION

The shortcomings of the prior art are overcome and additional advantages are provided through the provision of a method of managing compressed memory. A subset of items in memory, which is a portion of the contents of memory, is designated. Prior to accessing a particular item that has been referenced, the item is transferred into the subset, if it is not already a member of the subset.

In one example, the transferring of the item into the subset includes determining whether an estimate of free space of the memory is acceptable to allow the transfer, and performing the transfer, when the estimate is acceptable.

In a further example, the transferring includes changing information in one or more page tables to reflect the transfer. Additionally, in one example, the transfer includes removing another item from the subset. The removing also includes changing status information in one or more page tables to reflect the removal. The removal is performed without invalidating any cache lines of the removed item, which may be in a cache coupled to the memory.

In yet another embodiment of the invention, a method of managing compressed memory is provided, in which a subset of items in memory is designated, and access to a particular item, which is referenced, is provided when the item is a member of the subset. When the item is not a member of the subset, access is denied.

In another aspect of the invention, a system of managing compressed memory is provided. The system includes a subset of items in memory, in which the subset is a portion of the contents of memory, and means for transferring a referenced item into the subset, when the item is not a member of the subset, prior to accessing the item.

In another embodiment of the present invention, a system of managing compressed memory is provided. The system includes a subset of items in memory, and means for providing access to an item when the item is a member of the subset and denying access when it is not a member.

In yet another aspect of the present invention, an article of manufacture is provided. The article of manufacture includes a computer useable medium having computer readable program code means embodied therein for causing the managing of compressed memory. The computer readable program code means in the article of manufacture includes computer readable program code means for causing a computer to effect designating a subset of items in memory, in which the subset is a portion of the contents of the memory; and computer readable program code means for causing a computer to effect transferring a referenced item into the subset, when the referenced item is not a member of the subset, prior to accessing the item.

In another embodiment of the present invention, an article of manufacture including a computer useable medium having computer readable program code means embodied therein for causing the managing of compressed memory is provided. The computer readable program code means in the article of manufacture includes computer readable program code means for causing a computer to effect designating a subset of items in memory, and computer readable program code means for causing a computer to effect providing access to an item when the item is a member of the subset and denying access when it is not a member.

The present invention advantageously controls expansion of memory contents especially in those systems where such contents are compressed. Such control is provided by imposing some restrictions to references outside a specified subset M of the memory contents, and by controlling the transfer of pages (or cache lines) into the subset M, as a function of parameters, which may include, for example, estimates of the amount of free space and the net compression ratio for the contents of M.

Additionally, page-outs from M do not require that any cache contents be invalidated. Also, read-only access to pages outside M may not require any transfers into M. Further, the amount of free space is actually not determinable, since delays in obtaining this quantity from the compression controller represent time during which changes in this quantity may occur. Thus, the control mechanism described here involves the formulation of an dependency on bounds for the amount of available free space.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, expansion of the contents of memory is controlled in order to ensure sufficient space is available to store, for instance, compressed data. One example of a computing environment incorporating and using the present invention is described in detail with reference to FIG. 1.

Figure 1:
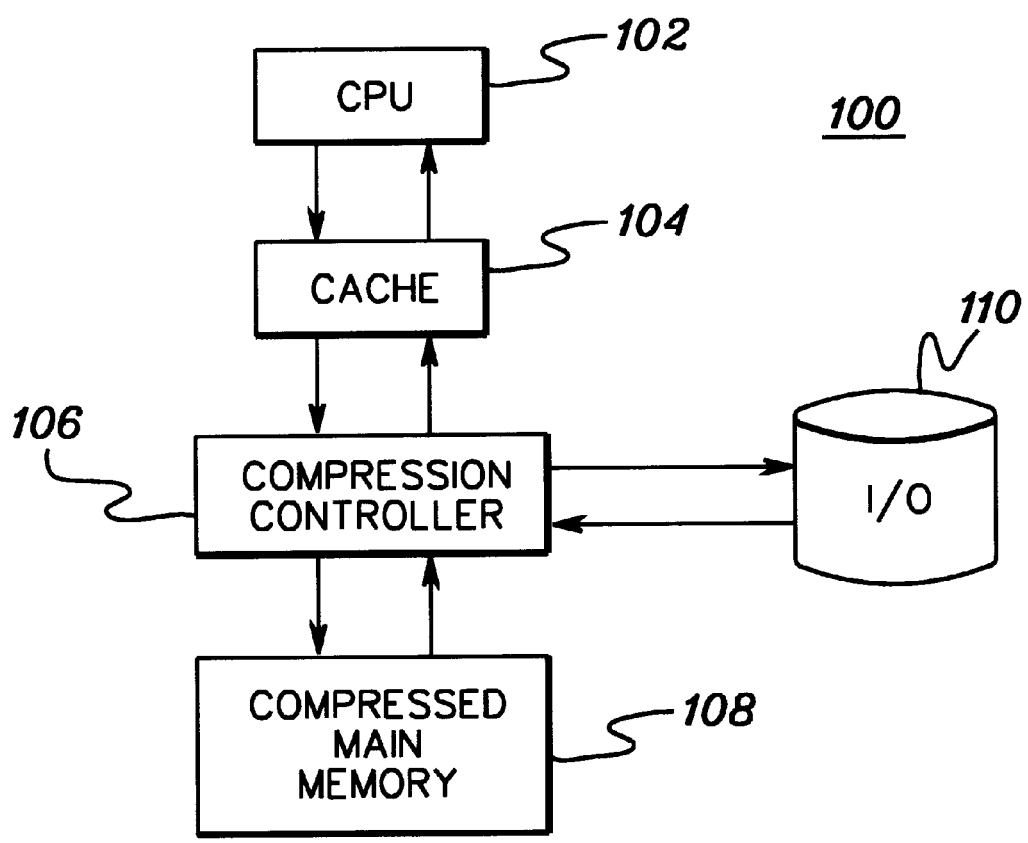
FIG. 1 depicts one example of a computing environment incorporating and using the memory organization capability of the present invention.

FIG. 1 depicts one example of a block diagram of a computing system 100 incorporating the memory management capability of the present invention. In one embodiment, computing system 100 includes a large server system, which except for the compression controller (described below) is exemplified by an RS/6000 offered by International Business Machines Corporation. Computing system 100 includes, for example, a central processing unit 102, a cache 104, a compression controller 106, compressed main memory 108 and one or more I/O devices 110, each of which is described in detail below.

As is known, central processing unit 102 is the controlling center of computing system 100. It executes at least one operating system, such as AIX offered by International Business Machines Corporation, which controls the execution of programs and the processing of data. The operating system is one component of computing environment 100 that incorporates and uses the capabilities of the present invention.

Coupled to central processing unit 102 is cache memory 104. Cache memory 104 provides a short term, high-speed, high-capacity computer memory for data retrieved by compression controller 106 from I/O devices 110 and/or main memory 108.

Coupled to cache 104 is compression controller 106, which manages, for example, the transfer of information between I/O devices 110 and cache 104, and/or the transfer of information between compressed main memory 108 and cache 104. Functions of the compression controller include the compression/decompression of data; and the storing of the resulting compressed lines in blocks of fixed size. This includes a mapping from real page addresses, as seen by the operating system, to addresses of fixed-size blocks in memory.

In accordance with the principles of the present invention, compression controller 106 also incorporates and uses the memory management technique of the present invention, as described in further detail below. (In another embodiment, the compression controller is not needed, and instead, the memory management technique of the present invention is performed by other hardware and/or software components within computing environment 100. As one example, the memory management technique can be performed by programs executed by the CPU.)

Compressed main memory 108, which is also coupled to compression controller 106, contains data which is compressed, for example, in units of cache lines. In one embodiment, each page includes four cache lines. Cache lines are decompressed and compressed respectively when inserted or cast-out of cache 104. Pages from I/O devices 110 are also compressed (in units of cache lines) on insertion into main memory 108.

Figure 2:
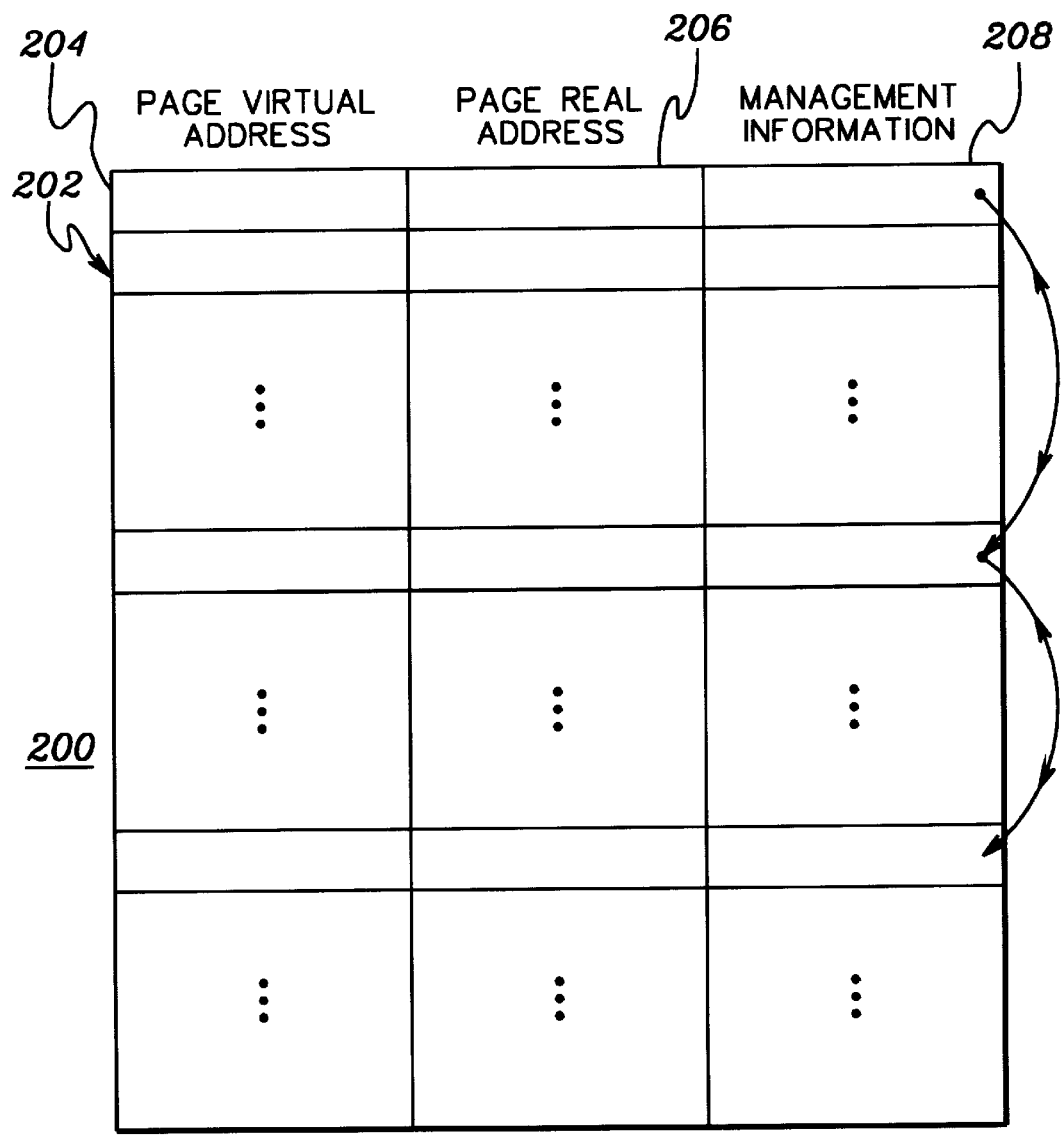
FIG. 2 depicts one illustration of a page table, in accordance with the principles of the present invention.

Information relating to pages of memory is stored in one or more page tables. One embodiment of a page table 200 is depicted in FIG. 2. Page table 200 includes a plurality of page table entries 202 and each entry includes, for instance, a virtual address 204 for a given page; a real address 206 corresponding to the virtual address for that page; and a set of management information 208 for the page.

In accordance with the principles of the present invention, the management information includes a number of fields, including, for instance, a use bit field indicating whether the page has been referenced; a read/write or read-only access field indicating the allowed type of access; an M membership field indicating whether the page is a member of a subset M, described in further detail below; one or more pointers linking the members of M; and an X membership field indicating whether the page is a member of a group X, also described further below.

In one embodiment, a portion of the one or more page tables is stored in a buffer attached to the CPU, such as a translation look-aside buffer (TLB), in order to enhance performance during dynamic address translation, as well as during the present invention. When a page is requested, the processor first checks the TLB to determine if information for the requested page is stored therein. If information for the requested page is stored in the TLB, then it is not necessary for the processor to go to the one or more page tables stored in the main memory or the cache for the information. However, if the TLB does not include information for the requested page, then the page tables are accessed. The use of the TLB is only one example, however. In another embodiment, the TLB is not needed.

One example of a TLB, as well as various address translations, are described in detail in J. L. Hennessy & D. A. Paterson, "Computer Architecture—A Quantitative Approach," 2nd Edition, Morgan Kauffman Publishers, San Francisco, Calif., pp. 445–446 (1996), which is hereby incorporated herein by reference in its entirety.

Figure 3:
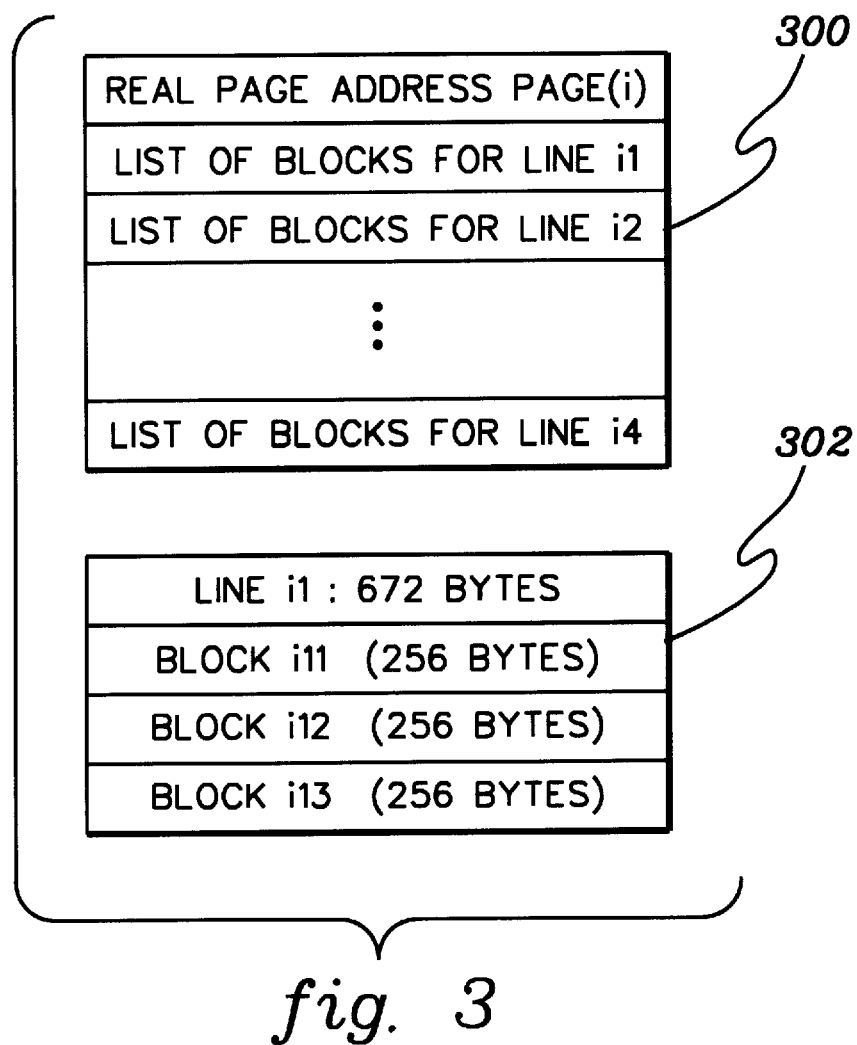
FIG. 3 depicts one example of the organization of physical addresses of pages of compressed main memory.

The real address of a page is mapped into a set of physical addresses (e.g., identifiers of blocks of storage) for each cache line, when the page is requested from main memory. In one example, this is accomplished using tables 300 and 302, illustrated in FIG. 3. Table 300 includes, for instance, what we term the real page address for a page, Page (i), as well as a list of the memory blocks for each line of the page. In one embodiment, each page is 4 k bytes in size and includes four cache lines. Each cache line is 1 k bytes in size.

Compressed cache lines are stored in fixed-size blocks of 256 bytes, as one example. Table 302 includes, for instance, the compressed blocks making up a particular line of Page (i). For example, line 1 of Page (i) includes three compressed blocks, each having 256 bytes. Since, in this embodiment, each page can include up to four cache lines and each cache line can include up to four compressed blocks of memory, each page may occupy up to 16 blocks of memory.

Figure 4:
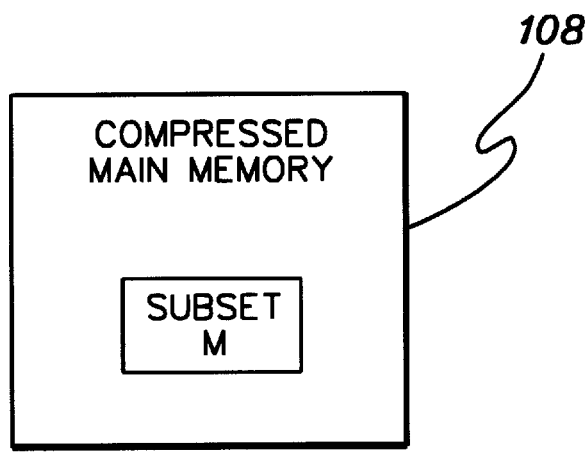
FIG. 4 depicts one example of a subset of compressed main memory, in accordance with the principles of the present invention.

In accordance with the principles of the present invention, the management of compressed main memory (MM) includes control over the expansion of main memory. In particular, the expansion of main memory is controlled by managing a subset of main memory, referred to herein as M, which represents a number of items in the compressed main memory (see FIG. 4). In one embodiment, the items are pages of memory, and thus, the embodiment is described in relation to pages. However, this is only one example. In another embodiment, the items may be other units of memory, such as, for example, cache lines.

In one embodiment of the present invention, the subset cannot grow indefinitely. The amount of required space can vary, but it cannot increase to be greater than some fixed amount. The size of subset M depends upon various tuning parameters, such as memory size and performance considerations. In one example, M may comprise some 10% of the pages currently in memory.

Figure 5:
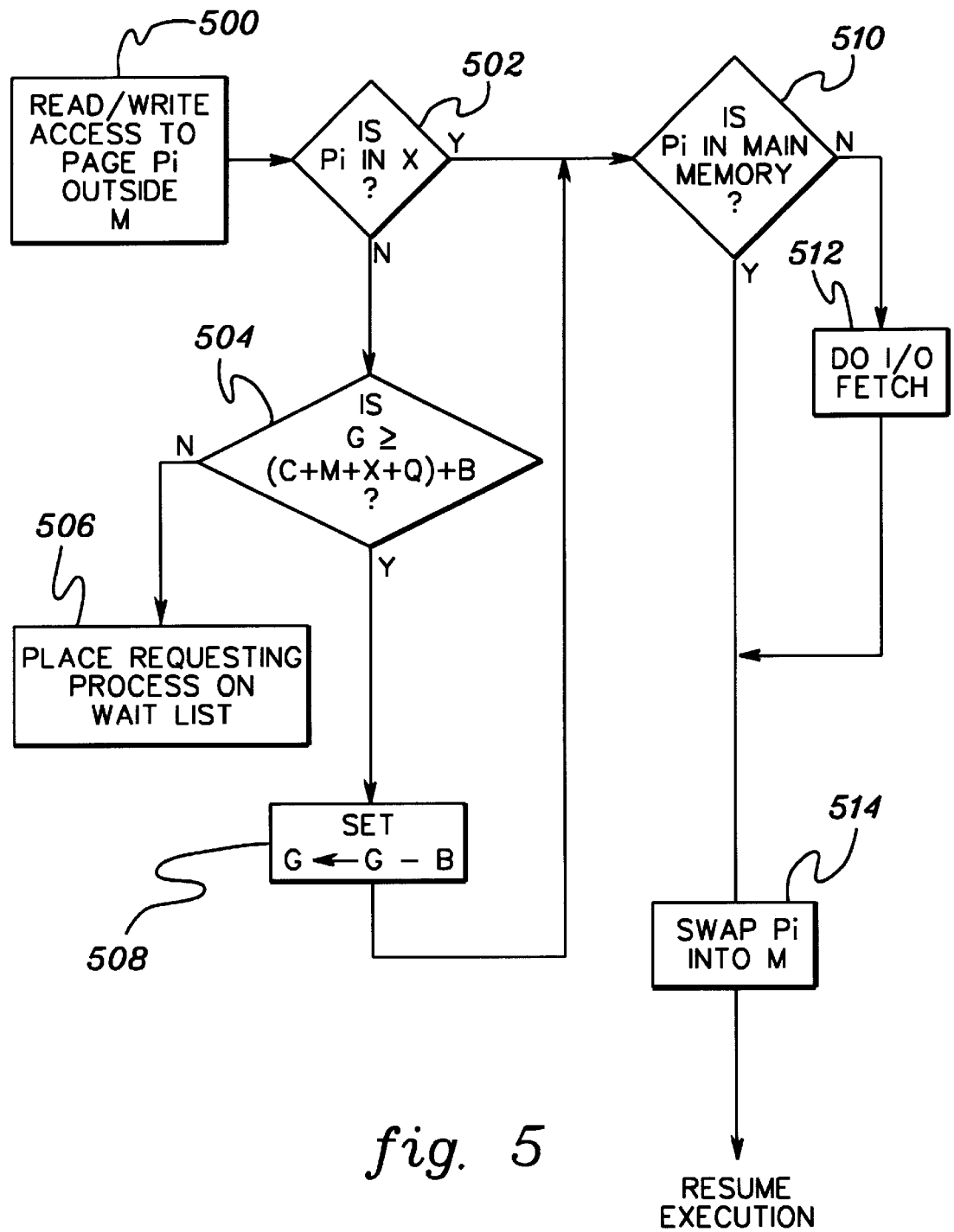
FIG. 5 depicts one example of a logic block diagram for memory accesses, in accordance with the principles of the present invention.

In accordance with the principles of the present invention, in order to have read/write access to a page in main memory, the page must be a member of M; however, read-only access does not require membership in M. Since read/write access requires membership in M, a technique is needed for when read/write access is requested for a page outside of M. One example of the logic associated with the decision process for read/write references outside of M is described in detail with reference to FIG. 5.

Initially, read/write access is requested for a page (P(i)) that is outside of the subset M, STEP 500. The processor determines that the page is outside of subset M by referring to the TLB and/or the one or more page tables. For example, when a request is made for a page, the processor checks the TLB to see if information for the page is in the buffer. If the information for the page is not in the TLB, then, the processor checks the M membership field in the page table entry for that page. The M membership field indicates whether the page is or is not within subset M.

Subsequent to determining that the page is outside of subset M, an inquiry is made to determine if the page is a member of a group X, INQUIRY 502. In accordance with the principles of the present invention, X denotes a set of pages which must be accessible in order to guarantee forward progress. Examples of the contents of X include the dispatcher and various input/output (I/O) routines. Membership in X is determined in a manner similar to that for membership in subset M. In particular, the X membership field for the corresponding page in the page table entry is checked to determine whether the page is a member of X, whenever the page is not in the TLB. In most implementations, pages which are members of X would be pinned in memory.

If the page is not a member of X, then a further determination is made to see whether there is sufficient free space in subset M to allow the page to be swapped into subset M, INQUIRY 504. This determination is made with reference to a parameter G. G is a quantity that is related to the size of the free space list (F) of the computer system. G is used by the operating system, in accordance with the principles of the present invention, to represent an estimate of the amount of free space, since F is not, in general, determinable by the operating system without substantial delay.

The compression controller has the capability of providing to the operating system, on demand, the size of the free space list. This list is a standard construct which identifies those storage blocks which are currently not utilized. However, the value presented to the operating system is imprecise, since the processing of a request to the compression controller for quantity F may overlap cache cast-outs and paging I/O, which modify F.

In order to determine if G is sufficiently large to allow the swap, the following test is made:

Is $G>=(C+M+X+Q)+B$?

where:
C is the size of the cache in units of 256 bytes;
M is the uncompressed size of the M membership in units of 256 bytes;
X is the uncompressed size of the X membership in units of 256 bytes;
B is the number of fixed-size blocks for each compressed page (e.g., 16); and
Q is B times the number of pending page-ins for subset M.

When the above test for G fails indicating that G is not large enough for the swap, the requesting process is placed on a wait list for future retrieval, STEP 506. The requesting process remains on the wait list until enough page-outs have occurred. On the other hand, when the test is successful, G is decreased by the value of B, STEP 508, and processing continues with INQUIRY 510.

After G is reset or if the page is a member of X, INQUIRY 502, then another check is made to see whether the page is in compressed main memory, INQUIRY 510. When the page is not in main memory, an I/O fetch is made in order to bring the page into main memory, as described further below, prior to performing the swap, STEP 512. Subsequent to fetching the page into main memory or if the page is already in main memory, the page is swapped into subset M, STEP 514, and control returns to the requesting program.

In accordance with one embodiment of the present invention, when a page is swapped into M, a selected page is swapped out. The page to be swapped out is chosen by a standard page replacement procedure, such as "The Clock Algorithm," described in A. S. Tanenbaum, Prentice-Hall, Englewood Cliffs, N.J., pp. 111 (1992), which is hereby incorporated herein by reference in its entirety. Unlike the case in a standard type of storage hierarchy, the removal of a page from M initially involves no physical movement or cache cast-out. Instead, this removal simply involves changing the M membership field in the appropriate page entry in page table 200, as well as deleting the page from the translation look-aside buffer (TLB), if one exists.

In another embodiment of the present invention, the requests to swap pages in subset M can be batched, so that a plurality of pages can be inserted and removed at one time.

A standard page replacement procedure (separate from that managing M) manages that part of main memory not including M. Thus, if the operating system requests that some number of pages be cast-out, they are selected by the page replacement algorithm from the contents of main memory, excluding M.

Figure 6:
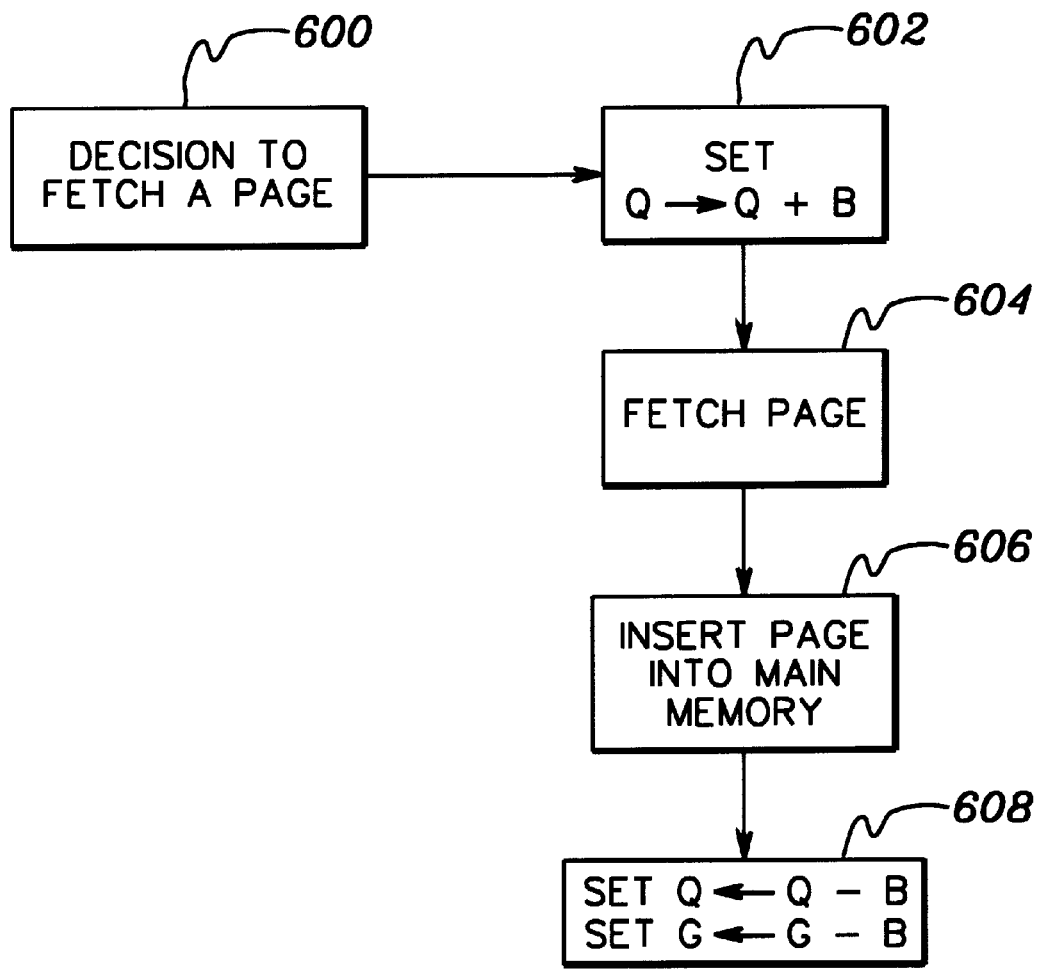
FIG. 6 depicts one embodiment of a logic block diagram for fetching a page from I/O, in accordance with the principles of the present invention.

As described above, before a page can be swapped into subset M, it needs to be in main memory. When the page is not in main memory, it is brought in using an I/O fetch. One embodiment for performing the I/O fetch is described with reference to FIG. 6.

Initially, a decision is made to fetch a page from a storage device, such as, for example, from disk or tape, STEP 600. Thereafter, Q is increased by the value of B, STEP 602, and the page is fetched using a standard operating system utility provided with the operating system, STEP 604. Subsequent to fetching the page, the page is inserted into compressed main memory, STEP 606, and the values of Q and G are decreased by B, respectively, STEP 608.

Described herein is a facility which ensures that there is sufficient free space. That is, if the only processes allowed to transfer pages into M are ones which reference only pages in X, then these processes have sufficient space to run. Other processes may continue execution until they attempt a page transfer into M. This may cause, in the worst case, all distinct lines in the combination of cache and M to be changed, with a corresponding utilization of free space. Maintaining an adequate free space reserve then ensures that processes utilizing X can run unimpeded.

Suppose F=(C+M+X). Then, if the only pages allowed to be swapped into M are members of X, the entire set X can be moved into M without running out of space. This is because the contents of M and those of the cache cannot expand to be greater than (C+M) during the time when X is being transferred into M.

Entrance into M is controlled by the parameter G, which is maintained by the operating system, in accordance with the principles of the present invention. G is decreased by B whenever (a) a page is swapped into M, or (b) an I/O operation is initiated to bring a page into M. In each case, the amount of free space that can be consumed is at most one page. G is increased via a reset operation. Here the operating system suspends both transfers into M (except for members of X), as well as initiation of I/O page-ins. The current value of F is then obtained from the compression store. G is then set to (F−Q), where Q is B times the number of pending page-ins. G can then only decrease until the next reset.

Suppose that F=(C+M+X+Q). By the time G is reset, the value of F might change due to either page-ins, or cache-line cast-outs. The number of page-ins cannot be greater than Q/B. Moreover, cast-outs are lines which are either members of pages in M or outside M. If in M, such cast-outs do not increase the number of distinct lines in the combination of the cache and M, so that the reserve of (M+C) is sufficient. If cast-outs are to pages outside M, the reserve requirement for lines in the cache and M is reduced. It follows that if F=(C+M+X+Q) at any time during the reset process, there is sufficient free space. Further, setting G to (F−Q) and maintaining G as above insures that whenever G>=(C+M+X+Q), there is sufficient free space, since G decreases at least as much as F due to transfers into M. G does not reflect cache cast-outs. However, these cannot decrease the amount of free space below that necessary to make forward progress.

A further use of G is to initiate page-outs. If after the reset process the value of G is found to be less than K1, where K1 is a threshold, N1 pages are paged out of compressed main memory. G is then reset, and the process repeated until G>K1. This maintains the amount of free space within desired limits.

The capability of the present invention for managing main memory such that the expansion of the contents of main memory is controlled includes, for example:

a) a subset M of the memory contents, such that accesses outside this set require, for instance, software intervention;

b) a mechanism in the operating system for transferring pages into and out of M;

c) the specification of a set of pages access to which has to be guaranteed; and d) a decision mechanism, using an estimate of the available space for determining whether a given access outside M should be permitted, with the possible alternative of placing the requesting process in a wait state.

The present invention can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing main memory, comprising:

designating a subset of pages in main memory, wherein at least one page of said subset of pages includes one or more items which are compressed and which are freely accessible without moving said at least one page to another portion of said main memory, and wherein said at least one page of said subset of pages occupies an amount of physical space which varies due to compression of said one or more items of said at least one page; and transferring an item which has been referenced, into said subset, when said item is not a member of said subset;

wherein said transferring comprises:

determining whether an estimate of free space of said main memory is acceptable to allow said transfer; and performing said transfer when said estimate is acceptable.

2. The method of claim 1, wherein said determining comprises using a function of a size of a free space list to obtain said estimate.

3. A method of managing main memory, comprising:

designating a first subset of pages in main memory which is freely accessible and a second subset of pages in main memory which is read accessible but is not write accessible, wherein at least one page of one or more of said first subset of pages and said second subset of pages includes one or more items which are compressed and which are freely accessible if in said first subset and read accessible but not write accessible if in said second subset without moving said at least one page to another portion of said main memory, and wherein said at least one page occupies an amount of physical space which varies due to compression of said one or more items of said at least one page; and transferring an item, which has been referenced, from said second subset into said first subset so that said item is freely accessible, said transfer being permitted when a specified bound on the amount of physical space said first subset occupies will not be exceeded.

4. The method of claim 3, further comprising transferring said item into said first subset, when said item is not a member of said first subset, said transferring being based on an estimate of free space of said main memory.

5. A system of managing main memory, comprising:
   a subset of pages in main memory, wherein at least one page of said subset of pages includes one or more items which are compressed and which are freely accessible without moving said at least one page to another portion of said main memory, and wherein said at least one page of said subset of pages occupies an amount of physical space which varies due to compression of said one or more items of said at least one page; and
   means for transferring an item, which has been referenced, into said subset, when said item is not a member of said subset;
   wherein said means for transferring comprises:
      means for determining whether an estimate of free space of said main memory is acceptable to allow said transfer; and
      means for performing said transfer when said estimate is acceptable.

6. The system of claim 5, wherein said means for determining comprises the use of a function of a size of a free space list to obtain said estimate.

7. A system of managing main memory, comprising:
   a designated first subset of pages in main memory which is freely accessible and a second subset of pages in main memory which is read accessible but is not write accessible, wherein at least one page of one or more of said first subset of pages and said second subset of pages includes one or more items which are compressed and which are freely accessible if in said first subset and read accessible but not write accessible if in said second subset without moving said at least one page to another portion of said main memory, and wherein said at least one page occupies an amount of physical space which varies due to compression of said one or more items of said at least one page; and
   means for transferring an item, which has been referenced, from said second subset into said first subset so that said item is freely accessible, said transfer being permitted when a specified bound on the amount of physical space said first subset occupies will not be exceeded.

8. The system of claim 7, further comprising means for transferring said item into said first subset, when said item is not a member of said first subset, said transferring being based on an estimate of free space of said main memory.

9. An article of manufacture comprising:
   a computer useable medium having computer readable program code means embodied therein for causing the managing of main memory, the computer readable program code means in said article of manufacture comprising:
      computer readable program code means for causing a computer to effect designating a subset of pages in main memory, wherein at least one page of said subset of pages includes one or more items which are compressed and which are freely accessible without moving said at least one page to another portion of said main memory, and wherein said at least one page of said subset of pages occupies an amount of physical space which varies due to compression of said one or more items of said at least one page; and
      computer readable program code means for causing a computer to effect transferring an item, which has been referenced, into said subset, when said item is not a member of said subset;
      wherein said computer readable program code means for causing a computer to effect transferring comprises:
         computer readable program code means for causing a computer to effect determining whether an estimate of free space of said main memory is acceptable to allow said transfer; and
         computer readable program code means for causing a computer to effect performing said transfer when said estimate is acceptable.

10. An article of manufacture comprising:
    a computer useable medium having computer readable program code means embodied therein for causing the managing of main memory, the computer readable program code means in said article of manufacture comprising:
       computer readable program code means for causing a computer to effect designating a first subset of pages in main memory which is freely accessible and a second subset of pages in main memory which is read accessible but is not write accessible, wherein at least one page of one or more of said first subset of pages and said second subset of pages includes one or more items which are compressed and which are freely accessible if in said first subset and read accessible but not write accessible if in said second subset without moving said at least one page to another portion of said main memory, and wherein said at least one page occupies an amount of physical space which varies due to compression of said one or more items of said at least one page; and
       computer readable program code means for causing a computer to effect transferring an item, which has been referenced, from said second subset into said first subset so that said item is freely accessible, said transfer being permitted when a specified bound on the amount of physical space said first subset occupies will not be exceeded.

11. The article of manufacture of claim 10, further comprising computer readable program code means for causing a computer to effect transferring said item into said first subset, when said memory reference is not a member of said first subset, said transferring being based on an estimate of free space of said main memory.

12. A method of managing main memory comprising:
    designating a first subset of pages in main memory which is read/write accessible and a second subset of pages in main memory which is read accessible but is not write accessible, wherein at least one page of said first subset of pages includes a fixed number of items and wherein one or more of said fixed number of items are compressed and read/write accessible without moving said at least one page to another portion of said main memory, and wherein said at least one page occupies an amount of physical space which varies due to compression of at least one of said one or more items; and
    transferring an item, which has been referenced for a read/write operation, from said second subset into said first subset when said item is not a member of said first subset so that said item is read/write accessible, wherein said transferring comprises changing a membership field associated with said first subset to indicate membership in said first subset.

* * * * *